United States Patent
Greenstein et al.

(10) Patent No.: US 8,429,404 B2
(45) Date of Patent: Apr. 23, 2013

(54) METHOD AND SYSTEM FOR SECURE COMMUNICATIONS ON A MANAGED NETWORK

(75) Inventors: Benjamin M. Greenstein, Seattle, WA (US); Jesse Walker, Portland, OR (US)

(73) Assignee: Intel Corporation, Santa Clara, CA (US)

(*) Notice: Subject to any disclaimer, the term of this patent is extended or adjusted under 35 U.S.C. 154(b) by 669 days.

(21) Appl. No.: 12/570,235

(22) Filed: Sep. 30, 2009

(65) Prior Publication Data
US 2011/0078443 A1 Mar. 31, 2011

(51) Int. Cl.
*H04L 9/32* (2006.01)
(52) U.S. Cl.
USPC ........... 713/169; 713/161; 713/163; 713/171; 709/229

(58) Field of Classification Search .................. 713/168, 713/169, 171; 709/217, 218, 227–229
See application file for complete search history.

(56) References Cited

U.S. PATENT DOCUMENTS

2003/0093669 A1* 5/2003 Morais et al. ................. 713/163
2006/0047968 A1* 3/2006 Nakagawa et al. ........... 713/176
2009/0217043 A1* 8/2009 Metke et al. .................. 713/171
2010/0131761 A1* 5/2010 Kim et al. ..................... 713/169

OTHER PUBLICATIONS

"Architecture of Secure Cross-Platform and Network Communications"; Jia et al, 2006, ACM; 8 pages.*
Greenstein et al., "Improving Wireless Privacy with an Indentifier-Free Link Layer Protocol", *MobiSys '08*, Jun. 17-20, 2008, Breckenridge, Colorado, USA, pp. 40-53.

* cited by examiner

*Primary Examiner* — Taghi Arani
*Assistant Examiner* — Jason Lee
(74) *Attorney, Agent, or Firm* — Shichrur & Co.

(57) ABSTRACT

A system and method for discovery and/or authentication of clients to a network, particularly a managed network, substantially without requiring the client and/or access device to transmit an unencrypted address or identification.

19 Claims, 4 Drawing Sheets

METHOD AND SYSTEM FOR SECURE COMMUNICATIONS ON A MANAGED NETWORK

FIELD OF THE INVENTION

The present invention relates to remote identity recognition, and in particular to recognition that may permit access from a remote access point to a network, for example, an enterprise network.

BACKGROUND OF THE INVENTION

A standard communication protocol, for example, any of the IEEE 802.11 protocols, may be used as a basis for communication between a client, or user, and a network. A network, for example, an enterprise network, that may allow access from one or more wireless access points, wired access points, or both, using these protocols may have a need to verify an identity of a client requesting network access. A method may be used, for example, using the IEEE 802.11i protocol, for network discovery and/or identification, and an authentication may occur and may be in accordance with a standard, for example IEEE 802.1X, by which a client may broadcast an identification to access points to enable recognition. However, some of these methods may lack security insofar as at least in the recognition phase, the client and access point communicate over an open, e.g., unencrypted, channel.

Thus, in the IEEE 802.11 standards generally, device identities are not protected during the protocol stages. Some communications methods may attempt to protect identities of clients and/or access points, for example, as described in Improving Wireless Privacy with an Identifier-Free Link Layer Protocol, published in MobySys'08, Jun. 17-20, 2008 (hereinafter "SlyFi"), the contents of which are incorporated herein by reference. However, the published SlyFi protocol may have drawbacks. For example, a client may be required to broadcast its unencrypted address and/or identification in the probe/discovery stage, which may be intercepted.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
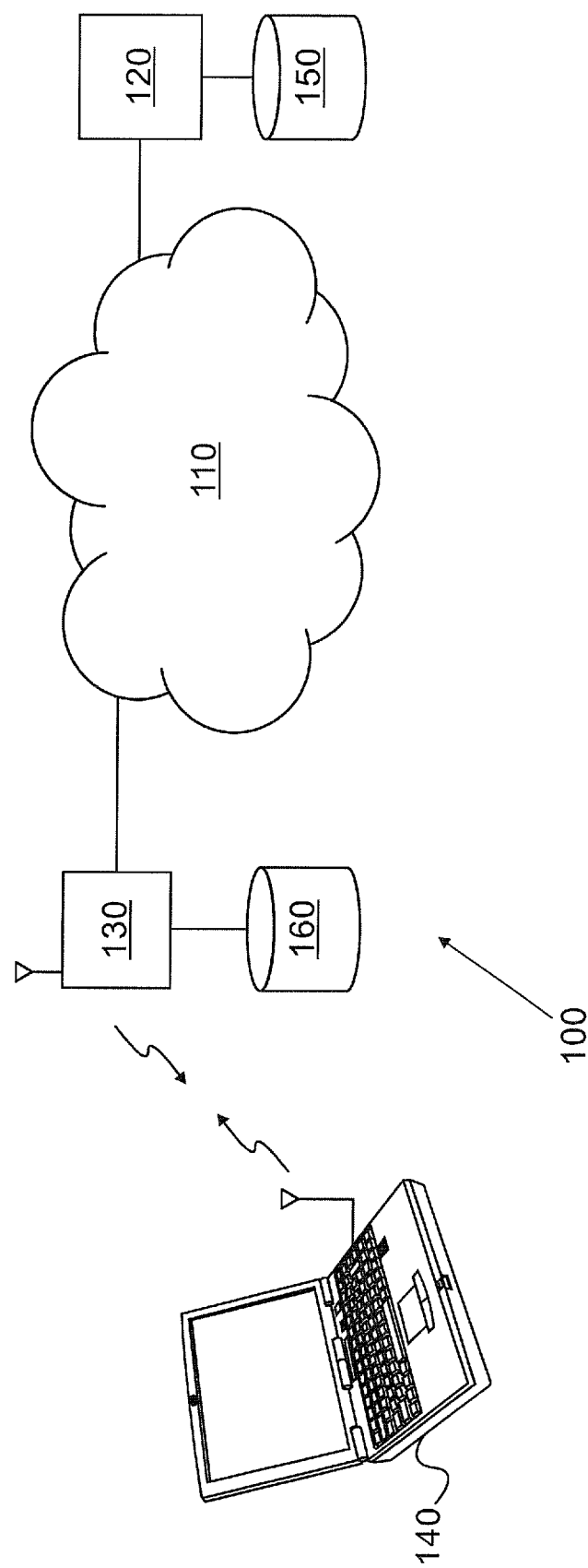
FIG. 1 depicts an exemplary block diagram illustrating an embodiment of a system according to embodiments of the present invention.

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a base station, a modem, a wireless modem, a Personal Computer (PC), a desktop computer, a mobile computer, a laptop computer, a notebook computer, a tablet computer, a netbook computer, a server computer, a handheld computer, a handheld device, a Personal Digital Assistant (PDA) device, a handheld PDA device, any consumer electronic device, a network, a wireless network, a Local Area Network (LAN), a Wireless LAN (WLAN), a Metropolitan Area Network (MAN), a wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.1X, 802.16, 802.16d, 802.16e standards and/or future versions and/or derivatives and/or Long Term Evolution (LTE) of the above standards, a Personal Area Network (PAN), a Wireless PAN (WPAN), units and/or devices which may be part of the above WLAN and/or PAN and/or WPAN networks, one-way and/or two-way radio communication systems, cellular radio-telephone communication systems, a cellular telephone, a wireless telephone, a Personal Communications Systems (PCS) device, a PDA device which may incorporate a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example Radio Frequency (RF), Infra Red (IR), Frequency-Division Multiplexing (FDM), Orthogonal FDM (OFDM) Time-Division Multiplexing (TDM), Time Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MCM), Discrete Multi-Tone (DMT), Bluetooth (RTM), ZigBee (TM), or the like. Embodiments of the invention may be used in various other apparatuses, devices systems and/or networks.

Although embodiments of the invention are not limited in this regard, discussions utilizing terms such as, for example, "processing," "computing," "calculating," "determining," "establishing," "analyzing," "checking," or the like, may refer to operation(s) and/or processes of a computer, a computing platform, a computing system, or other electronic computing device, that manipulate and/or transforms data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of stations" may include two or more stations.

Referring to FIG. 1, embodiments of the present invention may comprise a system 100 as schematically depicted. Network 110 may be an enterprise network, which connects and enables communication among a plurality of computing devices, for example, clients, servers, access points, routers, etc., using a communication protocol, for example, IEEE 802.3.

A supplicant, for example, a client 140 may wish to connect to a managed network 110 by means of a communication channel, for example, a wired, wireless, or other channel. Managed network 110 may be an enterprise network, or any network in which access is permitted to a known and limited set of users and/or devices by a central authority, such as an authentication server (described below). Client 140 may comprise or be associated with a communication module, for example, a modem, antenna, etc. Client 140 may further comprise or be associated with a processor for performing the encryption and/or decryption methods described herein, including, for example, encrypting its identification prior to transmission. Client 140 may further comprise or be associated with a memory for storing thereon encryption seed data, including, for example, its identification, a session key, and a common element, as described below.

A gateway to the network may be, for example, wireless access device 130, which may communicate wirelessly with clients, and allow or deny clients access to network 110, for example, using known communication protocols. Access device 130 may be an access point communicating with clients via an IEEE 802.11 protocol, a base station communicating with clients via an IEEE 802.16 protocol, or any other wireless access device. For purposes of simplicity, the gateway will be referred to herein as an access point or access device, however, it will be understood that the access device may use any wireless protocol. The gateway may be associated with a processor for performing encrypting and/or decryption functions as described herein. The gateway may further include, be associated with, or otherwise have access, e.g., local access, to a memory 160 having stored thereon an authentication table, as described below.

An authentication server 120, for example a Remote Authentication Dial In Use (RADIUS) server, may be a control hub for determining access policy for enterprise network 120 based on user identity, etc., and may be connected to access points 130, for example, over network 110. Authentication server 120 may include, be associated with, or otherwise have access, e.g., local or remote network access to a memory 150 having stored thereon, a master authentication table.

Access points may periodically send one or more beacons that may advertise a network name, for example a service set identifier (SSID), and a client may listen for such SSIDs. A client may also send packets, for example probe packets, that may ask an access point to respond with a corresponding SSID. A client may use responses from access points to build a list of SSIDs and may use this list to choose a network to use. This method of probing, listening, building and choosing a network may be a manual process or an automatic process, and may be based on preferences that may be set by a user. A client may send a request to a chosen network access point and this access point and network may respond. A client may then be associated with a chosen network, and may then be authenticated. A network may be an enterprise network, and a network may be a wired network, a wireless network, or both. A method may be used to authenticate a client on a network, and may be a standard method, for example 802.1X. An authentication method, for example 802.1X, may provide a port-based authentication, and may involve communication between a supplicant, for example a client device, an authenticator, for example an access point, a wireless access point, a wired Ethernet switch, or the like, and an authentication server, for example a Remote Authentication Dial In Use (RADIUS) database. An authenticator may guard access to a network that may be protected. A supplicant may not be allowed access to a protected side of a network until an identity of a supplicant may be authorized, and such access may be through an authenticator. A method for authentication, for example 802.1X port-based authentication, may have a supplicant provide credentials, for example a user name and password combination and/or a digital certificate, to an authenticator. An authenticator may forward credentials of a supplicant to an authentication server for verification. If credentials may be deemed to be valid by an authentication server, for example credentials match one or more entries in an authentication server database, a supplicant, for example a client device, providing corresponding credentials may be allowed access to resources that may be located on a protected side of a network. An authenticator, for example a switch, may detect a new client, for example a supplicant, and may set a port to be enabled and set to a state that may be designated as "unauthorized," where only a restricted set of traffic may be allowed, for example 802.1X traffic. In such a state, other traffic, for example Dynamic Host Configuration Protocol (DHCP), and/or Hypertext Transfer Protocol (HTTP), may be blocked, and such traffic may be blocked at a link layer or data link layer. An authenticator may send a request for an identity to a supplicant, and a supplicant may respond with a packet that may be forwarded by an authenticator to an authenticating server. If a request may be accepted by an authenticating server, an authenticator may set a port from an "unauthorized" state to an "authorized" state or mode, and normal traffic may be allowed.

Figure 2:
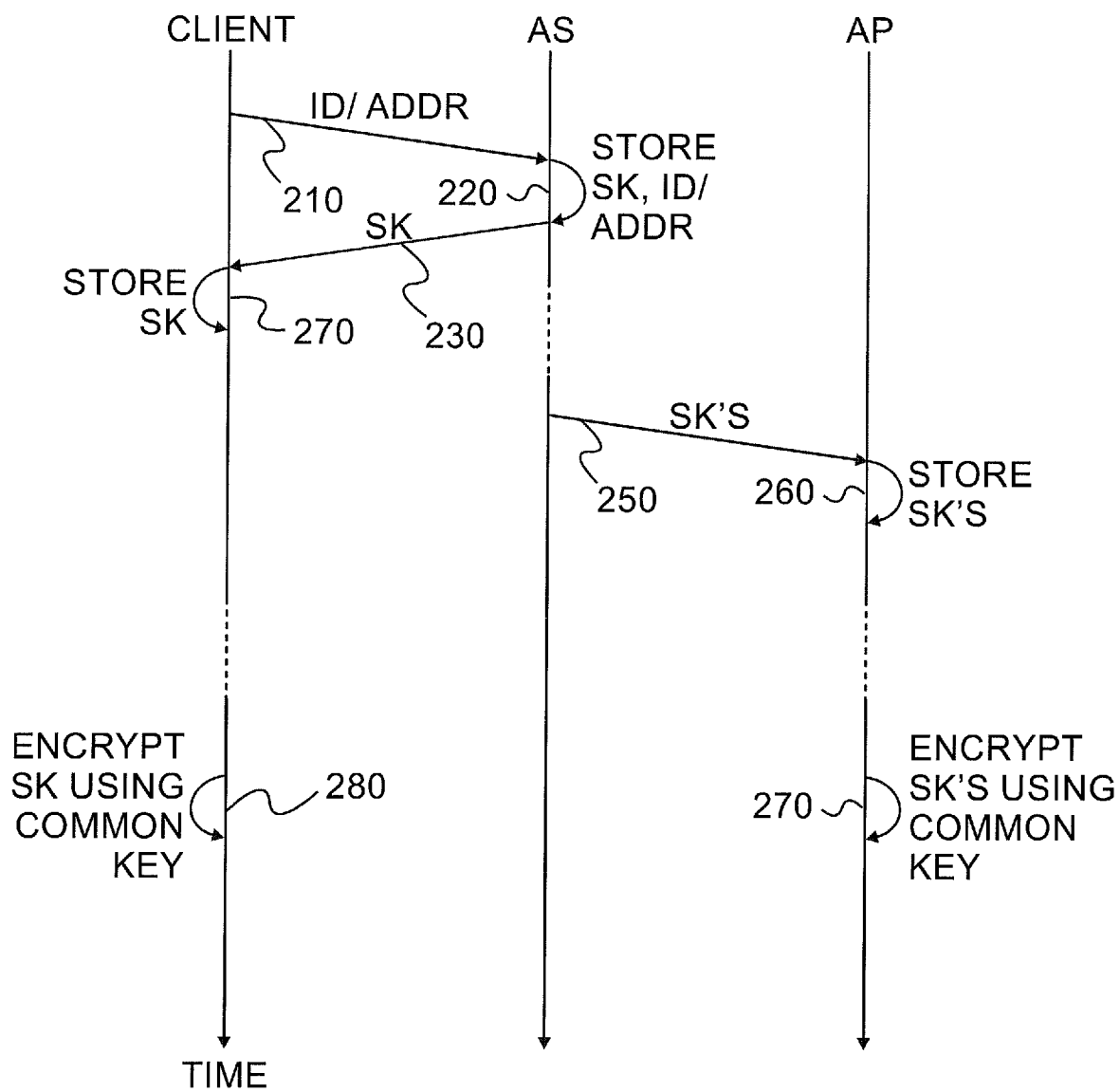
FIG. 2 depicts a method of authentication according to embodiments of the present invention.

According to embodiments of the invention, several preparatory steps prior to the event of authentication may be performed, for example, as depicted in the schematic communication diagram of FIG. 2. In an embodiment of the invention, during in an initiation session, an authentication server may communicate with a client. The client may provide its physical and/or logical address and/or client identification to the authentication server (210). The authentication server may generate one or more client session keys. In some embodiments of the invention, a client session key (SK) may be one or more session identification parameters associated with an initiation communication session, which may be generated by the authentication server or the client, but in any event known to both, or communicated from one to the other. For purposes of simplicity, one client session key, particularly, a SK is referred to, but it is understood that in the same manner, there may be any number of client session keys determined in an initiation session and used for authentication, as described below. $k_{CR}$ may be a symmetric key that may be shared by a client and a server. There may be a time period Is, for example a session epoch, that may be predetermined in length, for example one week, and may have a start time To. $k_{CR}$ may be a shared key and may be derived from any pairing technique or may be generated, for example from a password. The authentication server may store the client session key, e.g., the SK, together with the client address and/or identification, for example, in one or more master authentication tables (220), which may include substantially all client session keys and corresponding client addresses and/or identifications in the enterprise network. It will be recognized that any suitable data structure may be used, for example, in some embodiments, one table including client session keys, addresses and/or identifications, or in some embodiments, two actual or logical tables may be used, one to associate the client session keys with physical and/or logical client addresses, and another to associate client session keys with client identifications. Although in the following description, reference is made to a master table, it will be recognized that the master table may be comprised of a number of actual or logical tables.

Addresses and/or information may be in an encrypted form, and may be in a form of packets, for example SlyFi packets. Packets may be recognized and/or deciphered from a client on behalf of a server and/or from a server on behalf of a client, and deciphering may be by a device that may be in addition to a client or a server, where such a device may be an access point. At a beginning of a time period Is, for example an epoch or a session epoch, a server may generate session keys $k^{addr}_{CA}$, $k^{MAC}_{CA}$ and $k^{enc}_{CA}$, and these session keys may be pseudorandom in nature. Session keys may be generated by enciphering Is and may use $k_{CR}$. For example, an enciphering may be:

$$k^{ADDR}_{CA}=AES(k_{CR})(3\times I_s)$$

$$k^{MAC}_{CA}=AES(k_{CR})(3\times I_s+1)$$

$$k^{enc}_{CA}=AES(k_{CR})(3\times I_s+2)$$

The authentication server may send the client session key to the client (230), and the client may store the client session key (240). In some embodiments of the invention, other information may be communicated between the authentication server and the client, which may also be stored in the table(s). For example, there may be an expiration date associated with the respective client session key, such that after such expiration date, the client session key is no longer to be used, thereby requiring the client to obtain a new client session key periodically, for example, every day, every week, every month, every 3 or 6 months, etc.

The authentication server may publish the master table of client session keys and optionally other information to all or substantially all access points in enterprise network periodically, for example, every 24 hours (250). In some embodiments of the invention, other information, such as physical and/or logical client address, client identification, and/or expiration date corresponding to client session keys may be stored in the table and published. It will be recognized that in some embodiments of the invention, the entire table need not be published, but rather changes from a previously published master authentication table, and access points may update their respectively stored tables. It will be recognized that authentication server may provide the client session keys to other devices in addition to access devices. For example, in a managed system, devices used for enterprise network management may be provided copies of or access to the master table that authentication servers give to the access devices, for example, in order to provide managed network administrators the flexibility to give arbitrary devices under their control the ability to monitor their networks.

After receiving and/or generating the updated authorization table(s), access points may store the updated table including the client session keys and optionally other information (260).

The access point may generate probe request keys based on the session keys and a common data element (270). In some embodiments of the invention, the access point may generate a probe request key for each of the respective client session keys in the table. In some embodiments of the invention, there may be a rule known at least by clients and access points for producing the probe request key, for example, encrypting the client session key using a known encryption and a common data element known to or independently derivable by both the client and the access point. For example, the common data element may be obtained based on a timestamp using a known rule, as described further below. It will be recognized that other mechanisms may be used additionally or alternatively to time (epoch) to synchronize a nonce without communication between the client device and the access device. An authenticator may communicate via a link, for example a network link, and such communication may be with a network server and/or an enterprise network server, for example a RADIUS server. A session key may be received, and may be from a server. Addresses that may be valid addresses may be generated using such a session key. Addresses that may be generated may be added to a table of addresses that may be valid for communication, and such table may be stored locally, for example in a memory. A determination may be made if a timer, for example an epoch timer, or other time period mechanism may have expired or concluded. If an expiration may have occurred, addresses may be generated, or re-generated.

A server may send a message, for example $\{k^{addr}_{CA}, k^{MAC}_{CA}, k^{enc}_{CA}, R\}$ to every access point. A same message may be sent and/or received by all authenticators. A server may derive a session key, for example $k^{addr}_{CA}$, and may share this key with an access point, and may be effectively sharing temporary addresses, for example SlyFi-style temporary addresses. Session keys $k^{MAC}_{CA}$ and $k^{enc}_{CA}$ may be used to protect messages, for example SlyFi messages. Any access point that may receive a message may begin to maintain an address table, where this address table may be stored in a memory. The addresses that may be stored may be of a predetermined format, for example SlyFi addresses. An address may remain stationary during a discovery phase, where a client that may have entered a region around an access point may be able to discover a presence of an access point, where region may be a region around an access point where communication with an access point may be possible. An epoch duration that an address, for example a SlyFi address, may remain stationary may be Is. At every time Ti, a temporary address may be generated by access point 230, where Ti may be, for example, $$T_i=T_o+i\times I_A$$

or another value that may be generated that may be based on an index, for example time. An address that may be generated may be temporary and may be $$addr_{CA}=AES\{k^{addr}_{CA}\}(I)$$

where $$I=\lfloor (T-T_o)/I_A \rfloor$$

may be a given value of I. The terminology $\lfloor a \rfloor$ may denote a floor of a, or, for example a greatest integer n that may satisfy $n \leq a$. Such addresses, or temporary addresses, may equip an access point to communicate via a secure protocol, for example SlyFi.

In similar fashion, the client may determine a probe request key based on the client session key and a common data element, substantially in the same manner as the access point (280). A client may generate session keys, for example SlyFi session keys that may be for a relationship between a client and an access point. A client may populate a table of addresses that may be one-time addresses, and may be addresses by which an access point may address a client. A client may generate keys, for example session keys, and addresses, for example, temporary addresses, in a same manner as an access point may generate keys and addresses. The access point and client may encrypt the client session key periodically using varying common data elements, for example, a changing timestamp, as required. This determination of the common data element and the period of its variation may be determined by authentication server and communicated to the clients and access points during the initiation session or otherwise over the network prior to authentication. Therefore, according to embodiments of the invention, a client having been duly initiated by authentication server may be able to produce a probe request key that will be recognized by an access point having an updated client session key table, without having to receive the actual client address or identification.

Figure 3:
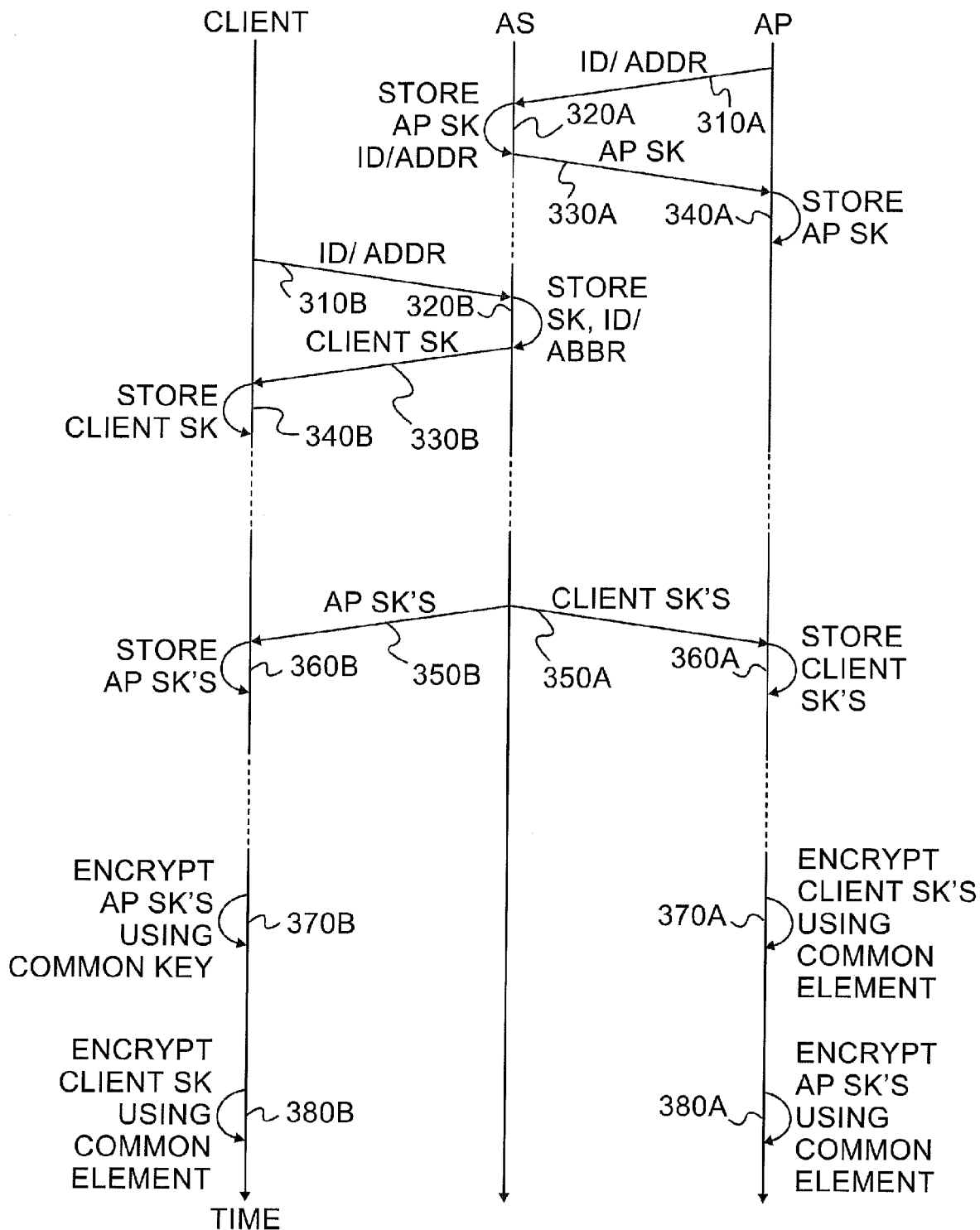
FIG. 3 depicts a method of authentication according to embodiments of the present invention.

In some embodiments of the invention separate session keys and/or sets of session keys may be generated for each direction of the client-access point link. For example, each access point may maintain a table of client session keys, as described above, and each client may also maintain a table of access point session keys, as described with reference to FIG. 3, in which both access points and clients are assigned respective session keys.

In an embodiment of the invention, during an access point initiation session, an authentication server may communicate with an access point. The access point may provide its physical and/or logical address and/or access point identification to the authentication server (310A). The authentication server may generate one or more session keys. In some embodiments of the invention, a session key may be one or more session identification parameter (SK) associated with the initiation communication session, which may be generated by the authentication server or the access point, but in any event known to both, or communicated from one to the other. For purposes of simplicity, one session key, particularly, a SK is referred to, but it is understood that in the same manner, there may be any number of session keys determined in an initiation session and used for authentication, as described below. The authentication server may store the session key, e.g., the SK, together with the access point address and/or identification, for example, in one or more master authentication tables (320A), which may include substantially all session keys and corresponding access point addresses and/or identifications in the enterprise network. It will be recognized that any suitable data structure may be used, for example, in some embodiments, one table including session keys, addresses and/or identifications, or in some embodiments, two actual or logical tables may be used, one to associate the session keys with addresses, and another to associate session keys with identifications. Although in the following description, reference is made to a master table, it will be recognized that the master table may be comprised of a number of actual or logical tables.

The authentication server may send the session key to the access point (330A), and the access point may store the session key (340A). In some embodiments of the invention, other information may be communicated between the authentication server and the access point, which may also be stored in the table(s). For example, there may be an expiration date associated with the respective session key, such that after such expiration date, the session key is no longer to be used, thereby requiring the access point to obtain a new session key periodically, for example, every week, every month, every 3 or 6 months, etc. An embodiment of the invention may include operation of an authentication server, for example a RADIUS server, where a determination may be made if a timer, for example an epoch timer, a session epoch timer, or other time period mechanism may have expired or concluded. If an expiration may have occurred, one or more keys, or session keys, may be generated. Keys that may have been generated may be sent to an authenticator, for example an access point. Keys may be sent via a network, for example an enterprise network.

The initiation of the client may proceed in steps 310B, 320B, 330B, and 340B substantially as described above with reference to corresponding steps 210, 220, 230, and 240 of FIG. 2. For example, according to an embodiment of the invention, a supplicant may determine if a desired network service may be available, and a determination may include an additional determination if secure access to such network may be available. If such desired network service may be available, and a supplicant may be connected, communication may continue. If such desired network service may not be available, a supplicant may generate one or more session keys. Such session keys may be generated using a predetermined key, where such predetermined key may be a key previously determined from a network, for example an enterprise network. A supplicant may send and/or transmit a probe signal. If a supplicant may receive a valid response a supplicant may authenticate a response in accordance with, for example, predetermined addresses and/or keys.

The authentication server may publish the master table of client session keys and optionally other information to all or substantially all access points in enterprise network periodically, for example, every 24 hours (350A), as described above with reference to step 250 in FIG. 2. The authentication server may publish the master table of access point session keys and optionally other information to all or substantially all clients in enterprise network periodically, for example, every 24 hours (350B). In some embodiments of the invention, other information, such as an physical and/or logical address, a client identification, and/or an expiration date corresponding to a session key may be stored in the table and published. It will be recognized that in some embodiments of the invention, the entire table need not be published, but rather changes from a previously published master authentication table, and access points may update their respectively stored tables.

After receiving and/or generating the updated authorization table(s), access points may store the updated table including the client session keys and optionally other information (360A). After receiving and/or generating the updated authorization table(s), clients may store the updated table including the access point session keys and optionally other information (360B).

The access points may generate probe request keys for each client based on the clients' session keys and a common data element (370A). The clients may generate probe receipt keys for each access point based on the access points' session keys and a common data element (370B). As described above, the common data element may be commonly known to or derivable by clients and access points alike.

As described below, prior to commencing the authentication protocol, the client may determine a probe request key based on its client session key and the common data element (380B). Likewise, prior to sending the probe receipt, the access point may determine a probe receipt key based on its access point session key and the common data element (380A). Therefore, according to embodiments of the invention, a client having been duly initiated by authentication server may be able to produce a probe request key that will be recognized by an access point having an updated client session key table, and an access point having been duly initiated by authentication server may be able to produce a probe receipt key that will be recognized by a client having an updated access point session key table. An embodiment of the invention may include operation of an authenticator, for example an access point, where an authenticator may communicate via a link, for example a wireless link, and such communication may be with a supplicant. An authenticator may receive a packet that may be encrypted, for example a SlyFi packet. An authenticator may determine if an address of a packet that may be received may be in a table. A packet that may be received may be in a format of a protocol, for example a SlyFi packet. A table may be predetermined, and may be stored in a memory. If an address of a packet that may be received may be found in a table of allowed addresses, a received packet may be decoded, and any outgoing packets that may be sent to a sender of a received packet may be encrypted.

A client may come close to, or in contact with, an access point and may begin to communicate with such an access point. A client and an access point may recognize one or more common encryption keys. Communication between a client and a network may be allowed, and such communication may be via an access point, where a client and an access point have recognized one or more common encryption keys.

It will be recognized that the authentication may be similar to the SlyFi authentication process, as modified in embodiments of the present invention, particularly in the probe and/or authentication steps. For example, the basic structure of the protocol may be maintained, including Tryst (Probe Request); Tryst (Probe Reply); Tryst (Authentication Request); Tryst (Authentication Reply); Shroud (Association Request); Shroud (Association Reply); Shroud (Data); Shroud (Acks), and for purposes of efficiency, the details of these communications need not be repeated in full herein, other than to describe embodiments of the present invention. Such authentication may be in accordance with other protocols, and that may be a standard protocol, for example 802.11i authentication, and associations may be in accordance with a standard protocol, for example 802.11. Following a successful authentication, all messages and/or data between a supplicant and a network and/or access point may be encrypted, and such encryption may include packets that may be encrypted, for example using a SlyFi encryption. If a response received may be invalid, a supplicant may choose to use an unencrypted discovery method, for example 802.11, and then may continue with communication. Such communication may be limited, as encryption services may not be available.

Figure 4:
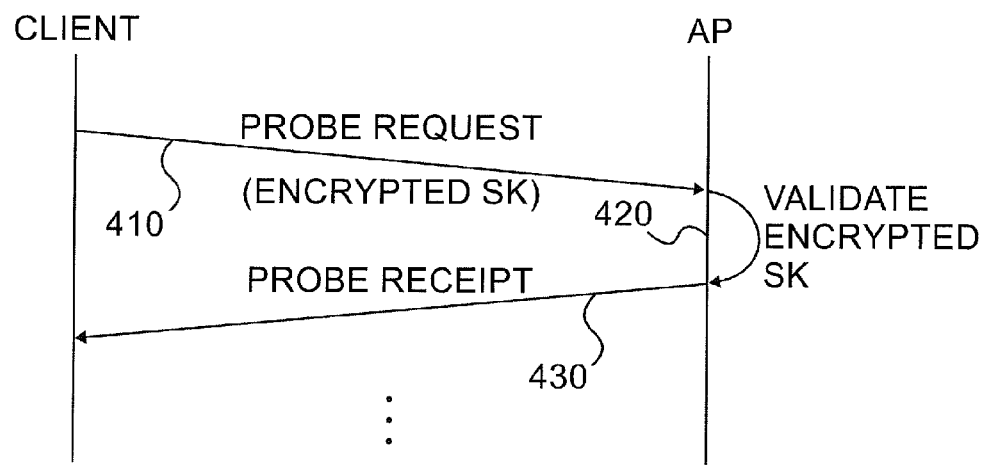
FIG. 4 depicts a method of authentication according to embodiments of the present invention.

According to embodiments of the invention, an authentication method may be performed, for example, as depicted in the schematic communication diagram of FIG. 4. A client may broadcast a probe request (410), using the probe request key, which may be, as described above, the client session key encrypted based on a common data element. An access point may determine validity or validate the probe request key (420), for example, as against the table of encrypted client session keys encrypted using the common data element. If the probe request is valid, then the access point may send a probe receipt as per the SlyFi protocol. In some embodiments of the invention, addresses and/or discovery messages that may be exchanged may be packets that may be encapsulated and/or ciphered by a given format, for example SlyFi. The authentication may then proceed as described in SlyFi or any other suitable protocol, for example an 802.11 protocol. In some embodiments of the invention, access point may be charged with performing authentication, for example, using the session key encrypted with a common data element. In other embodiments of the invention, or in some circumstances, e.g., based on security policy choices, access point may refer the authentication decision to the authentication server.

Figure 5:
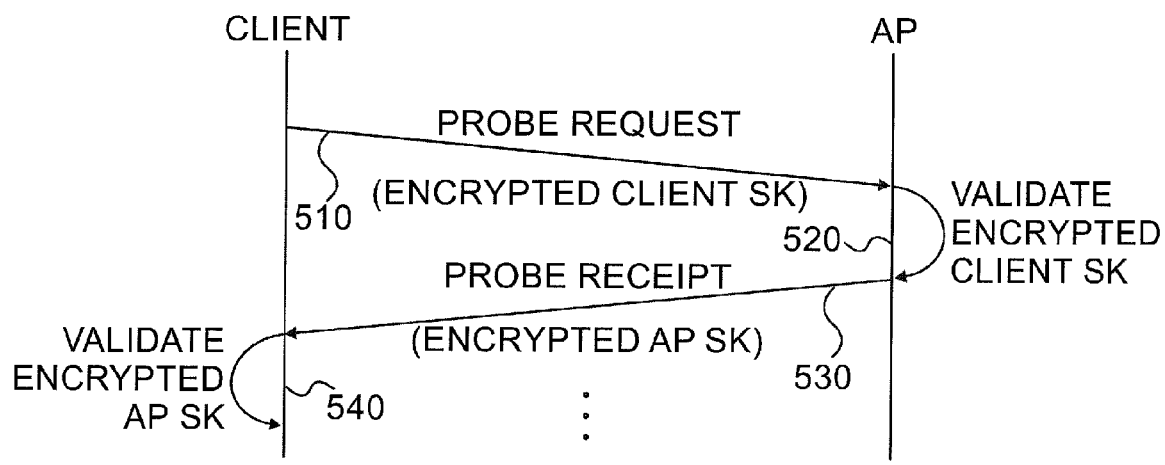
FIG. 5 depicts a method of authentication according to embodiments of the present invention.

According to some embodiments of the invention, an authentication method may be performed, for example, as depicted in the schematic communication diagram of FIG. 5. A client may broadcast a probe request (510), using the probe request key, which may be, as described above, the client session key encrypted based on a common data element. An access point may determine validity or validate the probe request key (520), for example, as against the table of encrypted client session keys encrypted using the common data element. If the probe request is valid, then the access point may send a probe receipt, which may include the session key of the access point, encrypted using the common data element (530). The client may then determine validity or validate the probe receipt key (540), for example, as against the table of encrypted access point session keys encrypted using the common data element. If the probe receipt is valid, then the client may continue to the authentication step as per the SlyFi protocol, or any other suitable protocol.

In some embodiments other elements, for example network monitors, other access points, and other network elements, may be deployed for a network and each may be designated to have access to packets that may be encrypted, for example SlyFi packets. Access to contents of these packets may be obtained by using a session key extension method that may be described, for example, by FIG. 2.

An embodiment of the invention may be implemented in a data link layer of a network.

An embodiment of the invention may be a protocol that may be used to prevent identifying, tracking and/or profiling of wireless device users, for example 802.11 based devices, and may be referred to as SlyFi, where this protocol may operate within a network that may be an enterprise network. A protocol, for example SlyFi, may use a method that may allow a client that may be searching for network services from, for example an access point, to discover an availability of an access point. Such a method may prevent an unauthorized client from discovering an availability of a wireless network. An identity of a client that may have an embodiment of the invention and that may be searching for network services, an identity of an access point that may have an embodiment of the invention and that may be able to provide network services and/or a relationship between such a client and such an access point that may be associated with a client may be hidden from a third party, for example a third party client or network, and may use an embodiment of the invention to be hidden, and may be in conjunction with a method, for example SlyFi and/or 802.11 protocols. A third party may not be able to learn client or access point identities. A network, for example a wireless network or an 802.11-based network, may be more private and/or secure using this method. An address, or network address, that may exist for a finite and defined period of time, and may be referred to as a one-time address, may be known and recognizable to a sender and to an intended recipient. A third party may not be able to address a component of a network that may be using such addresses, and it may be difficult for this third party to break into this network without this address information. These difficulties may add to a security of a network. A device that may provide a connection to a network, for example an access point or an 802.11 access point, may be co-located or physically separate from a device that may authenticate one or more clients, for example an 802.1X authentication server. An enterprise network may have an access point that may be physically separate from an authentication server.

According to embodiments of the invention, a pre-agreement on a key may protect a client identity and/or an access point identity. A client may use a standard, for example 802.11, and may use discovery-based mechanisms, for example 802.11i based discovery mechanisms, to identify candidate networks with which to communicate, and authentication with such networks may be via a standard, for example 802.1X. Enterprise Wi-Fi deployments may, for example, use this method. A network, for example an enterprise network, may use a method, for example as described above, to facilitate pre-agreement on a key. Privacy and authentication may then both be provided. An embodiment of the invention may be an authentication method, for example SlyFi, with a method of key distribution, for example as described above, and may provide unlinkability and/or anonymity of identities and/or profiles of clients of an enterprise network, an identity of a network, and/or knowledge of a relationship between a client and a network. This unlinkability and/or anonymity may be in an enterprise network.

It will be recognized that while embodiments of the invention discussed above make particular reference to the discovery and authentication stages of communication, principles of such embodiments of the invention may be applied to protect client device and access device identities in managed networks for all protocol stages, including communication, association, authentication, and discovery.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
receiving at a client device an assigned client session key and a plurality of access device session keys from an authentication server, the plurality of access device session keys corresponding to a plurality of access devices;
deriving, at said client device, a probe request key based on said assigned client session key and a common data element;
broadcasting, by said client device, a probe request including said probe request key for discovering one or more access devices;
receiving at said client device a probe receipt from an access device having said common data element, the probe receipt including an access device session key of said access device encrypted using said common data element; and
validating said probe receipt based on said common data element and an access device session key of said plurality of access device session keys.

2. The method of claim 1 comprising:
receiving at said access device a plurality of client session keys from said authentication server, said plurality of client session keys corresponding to a plurality of client devices; and
validating said probe request by said access device based on a client session key of said plurality of client session keys.

3. The method of claim 1 comprising deriving said common data element using a timestamp.

4. The method of claim 3 comprising periodically repeating said deriving said common data element using a different timestamp.

5. The method of claim 1, wherein said client device and said access device are associated with a managed network.

6. The method of claim 1, wherein said access device has the session key of said client device.

7. The method of claim 1 comprising periodically receiving at said client device an update of said plurality of access device session keys.

8. The method of claim 1, wherein said access device is an access point communicating according to an IEEE 802.11 wireless communication protocol.

9. The method of claim 1, wherein said access device is a base station communicating according to an IEEE 802.16 wireless communication protocol.

10. A method comprising:
receiving at an access device a plurality of client session keys from an authentication server;
deriving at said access device a plurality of probe request keys based on said plurality of client session keys and a common data element;
receiving at said access device a probe request, which is broadcast by a client device to discover one or more access devices, the received probe request including a received probe request key;
validating said received probe request based on matching said received probe request key to at least one of said plurality of derived probe request keys; and
transmitting from said access device to said client device a probe receipt including an access device session key of said access device encrypted using said common data element.

11. The method of claim 10 comprising deriving said common data element using a timestamp.

12. The method of claim 11 comprising periodically repeating said deriving said common data element using a different timestamp.

13. The method of claim 10 comprising receiving said access device session key from said authentication server.

14. The method of claim 10, wherein said access device is an access point to communicate according to an IEEE 802.11 wireless communication protocol.

15. The method of claim 10, wherein said access device is a base station to communicate according to an IEEE 802.16 wireless communication protocol.

16. A system comprising:
at least one client device to receive from an authentication server an assigned client session key and a plurality of access device session keys corresponding to a plurality of access devices, to derive a probe request key based on said assigned client session key and a common data element, to broadcast a probe request including said probe request key for discovering one or more access devices, to receive a probe receipt from an access device having said common data element, the probe receipt including an access device session key of said access device encrypted using said common data element, and to validate said probe receipt based on said common data element and an access device session key of said plurality of access device session keys.

17. The system of claim 16, wherein said client device is to derive said common data element using a timestamp.

18. A system comprising:
at least one access device to receive a plurality of client session keys from an authentication server, to derive a plurality of probe request keys based on said plurality of client session keys and a common data element, to receive a probe request, which is broadcast by a client device to discover one or more access devices, the received probe request including a received probe request key, to validate said received probe request based on matching said received probe request key to at least one of said plurality of derived probe request keys, and to transmit to said client device a probe receipt including an access device session key of said access device encrypted using said common data element.

19. The system of claim 18, wherein said access device is to derive said common data element using a timestamp.

* * * * *